US012654720B2

(12) United States Patent (10) Patent No.: US 12,654,720 B2
Lim (45) Date of Patent: Jun. 16, 2026

(54) APPARATUS AND METHOD FOR CONTROLLING CONVENIENCE FUNCTION OF VEHICLE

(71) Applicant: HYUNDAI MOBIS CO., LTD., Seoul (KR)

(72) Inventor: Hyeon Su Lim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 114 days.

(21) Appl. No.: 18/671,238

(22) Filed: May 22, 2024

(65) Prior Publication Data

US 2024/0400066 A1 Dec. 5, 2024

(30) Foreign Application Priority Data

Jun. 2, 2023 (KR) ........................ 10-2023-0071680

(51) Int. Cl.
*B60W 50/00* (2006.01)
*B60W 50/14* (2020.01)
(Continued)

(52) U.S. Cl.
CPC ........ *B60W 50/0098* (2013.01); *B60W 50/14* (2013.01); *G06V 20/59* (2022.01);
(Continued)

(58) Field of Classification Search
CPC ............. B60W 50/0098; B60W 50/14; B60W 2420/403; B60W 2540/21;
(Continued)

(56) References Cited

U.S. PATENT DOCUMENTS

2017/0311863 A1* 11/2017 Matsunaga ............ A61B 5/165
2018/0165359 A1* 6/2018 Banvait ............. G06F 17/30766
(Continued)

FOREIGN PATENT DOCUMENTS

KR 10-2391613 B1 4/2022

OTHER PUBLICATIONS

M. Lahoti, S. Gajam, A. Kasat and N. Raul, "Music Recommendation System Based on Facial Mood Detection," 2022 Third International Conference on Intelligent Computing Instrumentation and Control Technologies (ICICICT), Kannur, India, 2022, pp. 284-289, doi: 10.1109/ICICICT54557.2022.9917956 (Year: 2022).*

*Primary Examiner* — Russell Frejd
*Assistant Examiner* — Brittany Renee Peko
(74) *Attorney, Agent, or Firm* — Morgan, Lewis & Bockius LLP

(57) ABSTRACT

Disclosed are an apparatus and method for controlling a convenience function of a vehicle. The apparatus for controlling a convenience function of a vehicle may include a camera configured to capture an image of a passenger, a convenience device configured to provide a convenience function to the passenger, a voice output unit configured to output a Chatbot's conversation voice, a voice input unit configured to receive a conversation voice of the passenger, and a processor configured to recognize a facial expression of the passenger that is photographed by the camera and configured to recommend control over the convenience function to the passenger by performing conversations with the passenger through the voice output unit and the voice input unit based on the recognized facial expression of the passenger or to directly control the convenience function through the convenience device.

18 Claims, 4 Drawing Sheets

(51) Int. Cl.
*G06V 20/59* (2022.01)
*G06V 40/16* (2022.01)
*G06V 40/20* (2022.01)

(52) U.S. Cl.
CPC ............ *G06V 40/174* (2022.01); *G06V 40/28* (2022.01); *B60W 2420/403* (2013.01); *B60W 2540/21* (2020.02); *B60W 2556/10* (2020.02)

(58) Field of Classification Search
CPC .. B60W 2556/10; B60W 40/08; B60W 50/08; B60W 2040/089; B60W 2540/223; G06V 20/59; G06V 40/174; G06V 40/28; G06V 20/597; B60R 16/037; B60R 16/0231; G10L 15/22
See application file for complete search history.

(56) References Cited

U.S. PATENT DOCUMENTS

| | | | | |
|---|---|---|---|---|
| 2019/0176845 | A1* | 6/2019 | Yoon | B60W 50/14 |
| 2019/0276037 | A1* | 9/2019 | Ito | B60W 40/09 |
| 2020/0406752 | A1* | 12/2020 | Ahn | B60K 35/00 |
| 2022/0019616 | A1* | 1/2022 | Fu | G06F 16/5866 |
| 2022/0036048 | A1* | 2/2022 | Lee | G06K 9/00302 |
| 2024/0126256 | A1* | 4/2024 | Cella | G05D 1/227 |

* cited by examiner

FIG.4

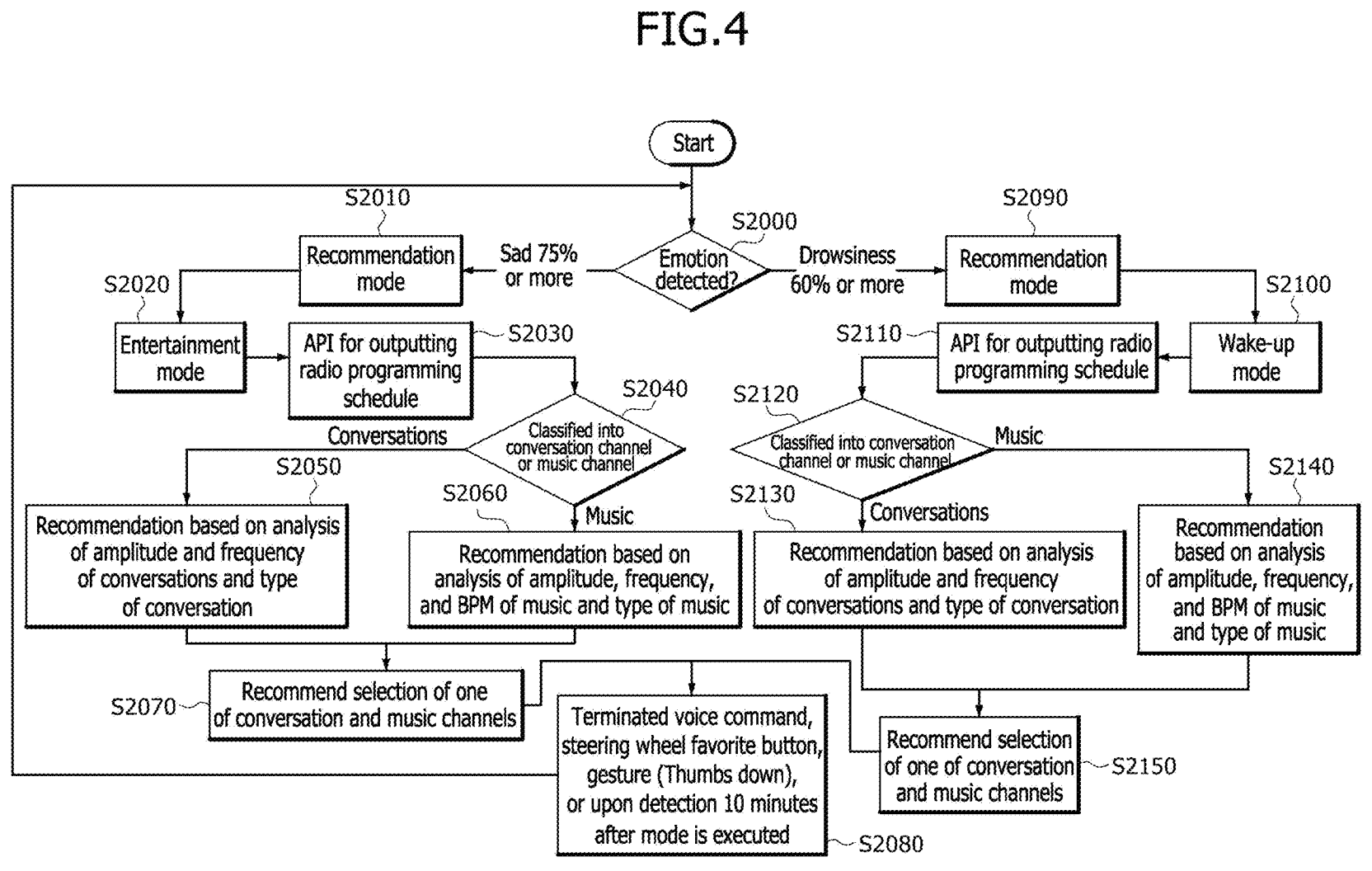

Start

S2000 — Emotion detected?

Sad 75% or more → S2010 Recommendation mode → S2020 Entertainment mode → S2030 API for outputting radio programming schedule → S2040 Classified into conversation channel or music channel Drowsiness 60% or more → S2090 Recommendation mode → S2100 Wake-up mode → S2110 API for outputting radio programming schedule → S2120 Classified into conversation channel or music channel S2040: Conversations → S2050 Recommendation based on analysis of amplitude and frequency of conversations and type of conversation S2040: Music → S2060 Recommendation based on analysis of amplitude, frequency, and BPM of music and type of music S2070 Recommend selection of one of conversation and music channels S2120: Conversations → S2130 Recommendation based on analysis of amplitude and frequency of conversations and type of conversation S2120: Music → S2140 Recommendation based on analysis of amplitude, frequency, and BPM of music and type of music S2150 Recommend selection of one of conversation and music channels S2080 Terminated voice command, steering wheel favorite button, gesture (Thumbs down), or upon detection 10 minutes after mode is executed

APPARATUS AND METHOD FOR CONTROLLING CONVENIENCE FUNCTION OF VEHICLE

CROSS-REFERENCE TO RELATED APPLICATION

This application claims priority from and the benefit of Korean Patent Application No. 10-2023-0071680, filed on Jun. 2, 2023, which is hereby incorporated by reference for all purposes as if set forth herein.

BACKGROUND

Field

Exemplary embodiments of the present disclosure relate to an apparatus and method for controlling a convenience function of a vehicle.

Discussion of the Background

Many convenience devices are added to a recent vehicle so that a driver can drive a vehicle more easily and conveniently.

The convenience devices include an automatic window switching device for opening and closing a window in an electromotive type, an automatic door locking device for automatically closing a door based on a driving speed of a vehicle, an air-conditioning device for controlling an air state within a vehicle, and a seat heating device for adjusting a vehicle seat temperature.

The background technology of the present disclosure has been disclosed in Korean Patent No. 10-2391613 (Apr. 25, 2022) entitled "SYSTEM OF PROVIDING CONVENIENCE SERVICE FOR VEHICLE".

SUMMARY

Various embodiments are directed to providing an apparatus and method for controlling a convenience function of a vehicle in which a convenience function is recommended or directly provided to a passenger through conversations with the passenger based on an emotion of a passenger.

In an embodiment, an apparatus for controlling a convenience function of a vehicle may include a camera configured to capture an image of a passenger, a convenience device configured to provide a convenience function to the passenger, a voice output unit configured to output a Chatbot's conversation voice, a voice input unit configured to receive a conversation voice of the passenger, and a processor configured to recognize a facial expression of the passenger that is photographed by the camera and configured to recommend control over the convenience function to the passenger by performing conversations with the passenger through the voice output unit and the voice input unit based on the recognized facial expression of the passenger or to directly control the convenience function through the convenience device.

In an embodiment, the processor controls the convenience function based on the conversation voice of the passenger that is input through the voice input unit or a gesture of the passenger that is detected by the camera.

In an embodiment, the convenience function is previously set according to an operation mode according to the facial expression of the passenger.

In an embodiment, the processor recommends, to the passenger, at least one of a conversation channel and a music channel that are scheduled in a radio programming schedule based on the facial expression of the passenger so that the passenger selects the at least one of the conversation channel and the music channel.

In an embodiment, the processor recommends the conversation channel based on the analysis of the amplitude and frequency of the conversations and the type of conversation, and recommends the music channel based on the analysis of the amplitude and frequency of music, the analysis of beats per minute (BPM) of the music, and the type of music.

In an embodiment, a method of controlling a convenience function of a vehicle may include capturing, by a camera, an image of a passenger, recognizing, by a processor, a facial expression of the passenger that has been photographed by the camera, and recommending, by the processor, control over a convenience function to the passenger through a voice output unit and a voice input unit based on the facial expression of the passenger by performing conversations with the passenger or directly controlling, by the processor, the convenience function.

In an embodiment, in the recommending of the control over the convenience function to the passenger or the directly controlling of the convenience function, the processor controls the convenience function based on a conversation voice of the passenger that is input through the voice input unit or a gesture of the passenger that is detected through the camera.

In an embodiment, the convenience function is previously set based on the facial expression of the passenger.

In an embodiment, in the recommending of the control over the convenience function to the passenger or the directly controlling of the convenience function, the processor recommends, to the passenger, at least one of a conversation channel and a music channel that are scheduled in a radio programming schedule based on the facial expression of the passenger so that the passenger selects the at least one of the conversation channel and the music channel.

In an embodiment, in the recommending of the control over the convenience function to the passenger or the directly controlling of the convenience function, the processor recommends the conversation channel based on the analysis of the amplitude and frequency of the conversations and the type of conversation, and recommends the music channel based on the analysis of the amplitude and frequency of music, the analysis of beats per minute (BPM) of the music, and the type of music.

The apparatus and method for controlling a convenience function of a vehicle according to an aspect of the present disclosure improve a commercial value and prevent an accident by recommending or providing a convenience function to a passenger through attempts on conversations with the passenger based on an emotion of the passenger.

The apparatus and method for controlling a convenience function of a vehicle according to another aspect of the present disclosure can provide a driver with new experiences by attempting conversations with the driver even in a situation in which the driver drives a vehicle alone.

BRIEF DESCRIPTION OF THE DRAWINGS

FIG. 4 is a flowchart illustrating another example of a method of controlling a convenience function of a vehicle according to an embodiment of the present disclosure.

DETAILED DESCRIPTION OF THE ILLUSTRATED EMBODIMENTS

Figure 1:
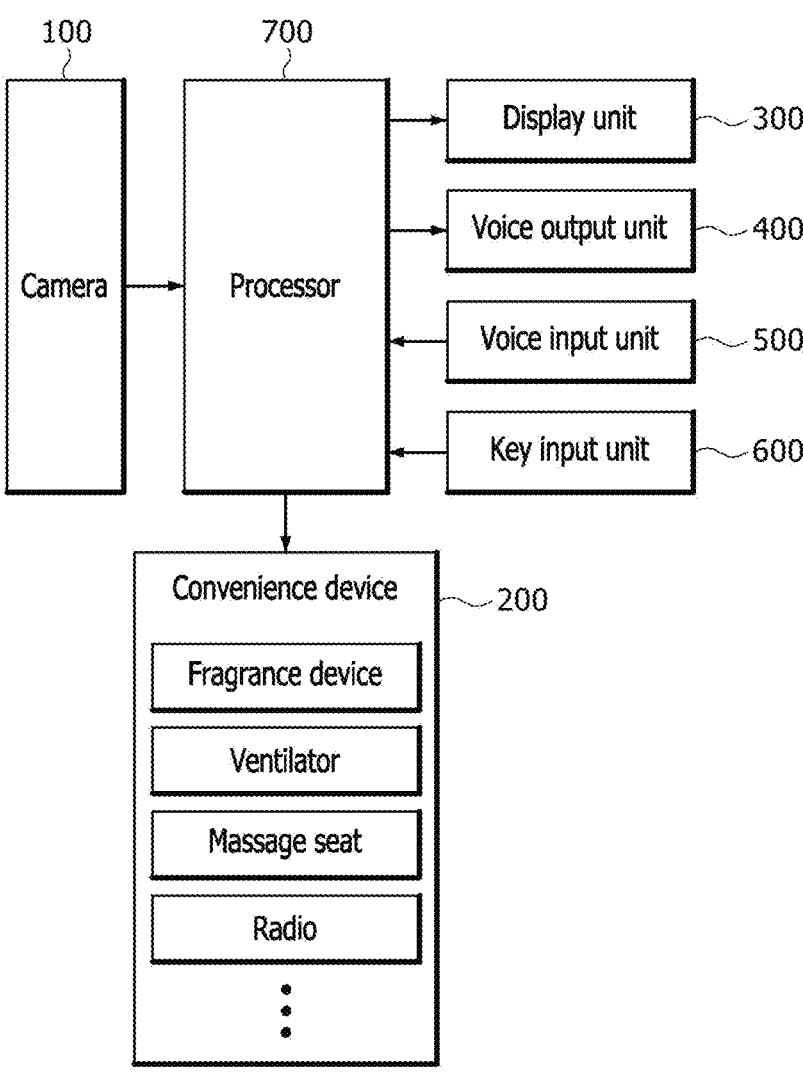
FIG. 1 is a block diagram of an apparatus for controlling a convenience function of a vehicle according to an embodiment of the present disclosure.

Hereinafter, an apparatus and method for controlling a convenience function of a vehicle according to embodiments of the present disclosure will be described with reference to the accompanying drawings. In this process, the thicknesses of lines or the sizes of components illustrated in the drawings may have been exaggerated for the clarity of a description and for convenience' sake. Terms to be described below have been defined by taking into consideration their functions in the present disclosure, and may be changed depending on a user or operator's intention or practice. Accordingly, such terms should be defined based on the overall contents of this specification.

Figure 2:
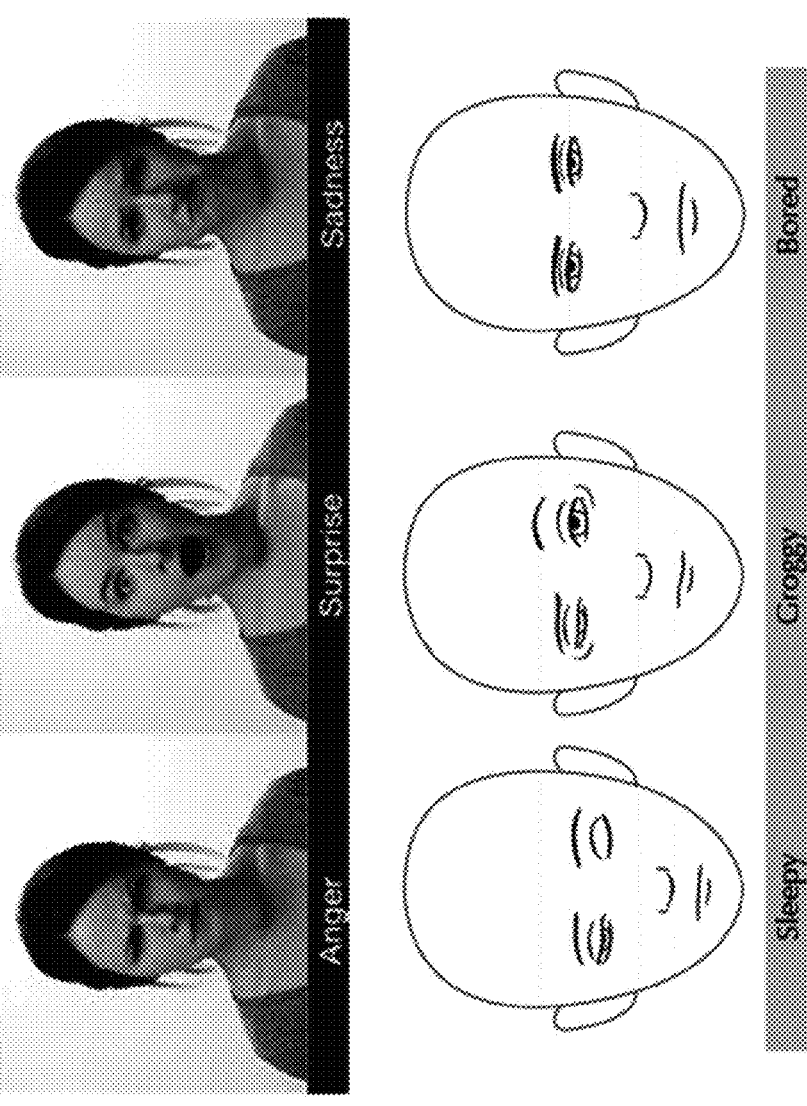
FIG. 2 is an exemplary diagram of facial expressions of a passenger according to an embodiment of the present disclosure.

FIG. 1 is a block diagram of an apparatus for controlling a convenience function of a vehicle according to an embodiment of the present disclosure. FIG. 2 is an exemplary diagram of facial expressions of a passenger according to an embodiment of the present disclosure.

Referring to FIGS. 1 and 2, the apparatus for controlling a convenience function of a vehicle according to an embodiment of the present disclosure includes a camera 100, a convenience device 200, a display unit 300, a voice output unit 400, a voice input unit 500, a key input unit 600, and a processor 700.

The camera 100 captures an image and transmits the captured image to the processor 700.

The camera 100 may photograph a face or gesture of a passenger.

The camera 100 may be installed at a place where a face or gesture of a passenger is suitable for being photographed.

The camera 100 may be a CMOS image sensor, a CCD image sensor, or an IR camera. The type of camera 100 is not specially limited.

The convenience device 200 provides various convenience functions to a passenger.

The convenience device 200 may include a fragrance device for generating a fragrance, a ventilator for ventilating the indoor of a vehicle, an air-conditioning device for performing an air-conditioning function, a massage seat for providing a massage function, and a radio for outputting radio broadcasting. The type of convenience device 200 is not specially limited. The convenience device 200 may be variously added depending on convenience functions which may be provided to a passenger.

The key input unit 600 receives various control commands of a passenger.

For example, the key input unit 600 may receive a control command for stopping or temporarily stopping a convenience function. In addition, the key input unit 600 may receive various control commands for controlling a convenience function that is currently provided.

A steering wheel button, a touch pad, a touch screen, an electron pen, or a touch button may be adopted as the key input unit 600. The type of key input unit 600 is not specially limited. All devices capable of providing a user interface may be adopted.

The display unit 300 displays the operating state of the processor 700.

For example, the display unit 300 displays at least one of information that provides guidance that a facial expression of a passenger is being recognized, information indicative of the results of the recognition of a facial expression, information that provides guidance that a gesture of a passenger is being recognized, information on a convenience function that is currently provided to a passenger, and selection information of a passenger.

A cluster of a vehicle or audio video navigation (AVN) may be adopted as the display unit 300. The display unit 300 may include various panels provided in a vehicle, for example, a thin film transistor-liquid crystal display (TFT-LCD) panel, a light-emitting diode (LED) panel, an organic LED (OLED) panel, an active matrix OLED (AMOLED) panel, and a flexible panel.

The voice output unit 400 outputs a Chatbot's conversation voice.

The voice input unit 500 receives a conversation voice of a passenger.

The processor 700 photographs a passenger by controlling the camera 100.

The processor 700 recognizes a facial expression of a passenger by analyzing an image captured by the camera 100. In this case, the processor 700 recognizes the facial expression as at least one of "anger, surprise, sadness, drowsiness, depression, being tired, and being bored" as illustrated in FIG. 2. A facial expression of a passenger that is recognized is not limited to the embodiment.

The processor 700 performs conversations with a passenger through the voice output unit 400 and the voice input unit 500 based on a recognized facial expression of the passenger. In this case, the processor 700 may recommend, to the passenger, control over a convenience function that is suitable for the facial expression of the passenger by controlling the convenience device 200. Alternatively, the processor 700 may directly control a convenience function that has been previously set for the facial expression of the passenger with respect to the passenger by controlling the convenience device 200.

The processor 700 may control an operation of a convenience function by receiving a control command for control over the convenience function from the key input unit 600. In this case, the processor 700 may stop or temporarily stop the convenience function in response to the control command received from the key input unit 600. Alternatively, the processor 700 may stop the convenience function after a preset time elapses after providing the convenience function.

Hereinafter, a method of controlling a convenience function of a vehicle according to an embodiment of the present disclosure is described with reference to FIGS. 3 and 4.

Figure 3:
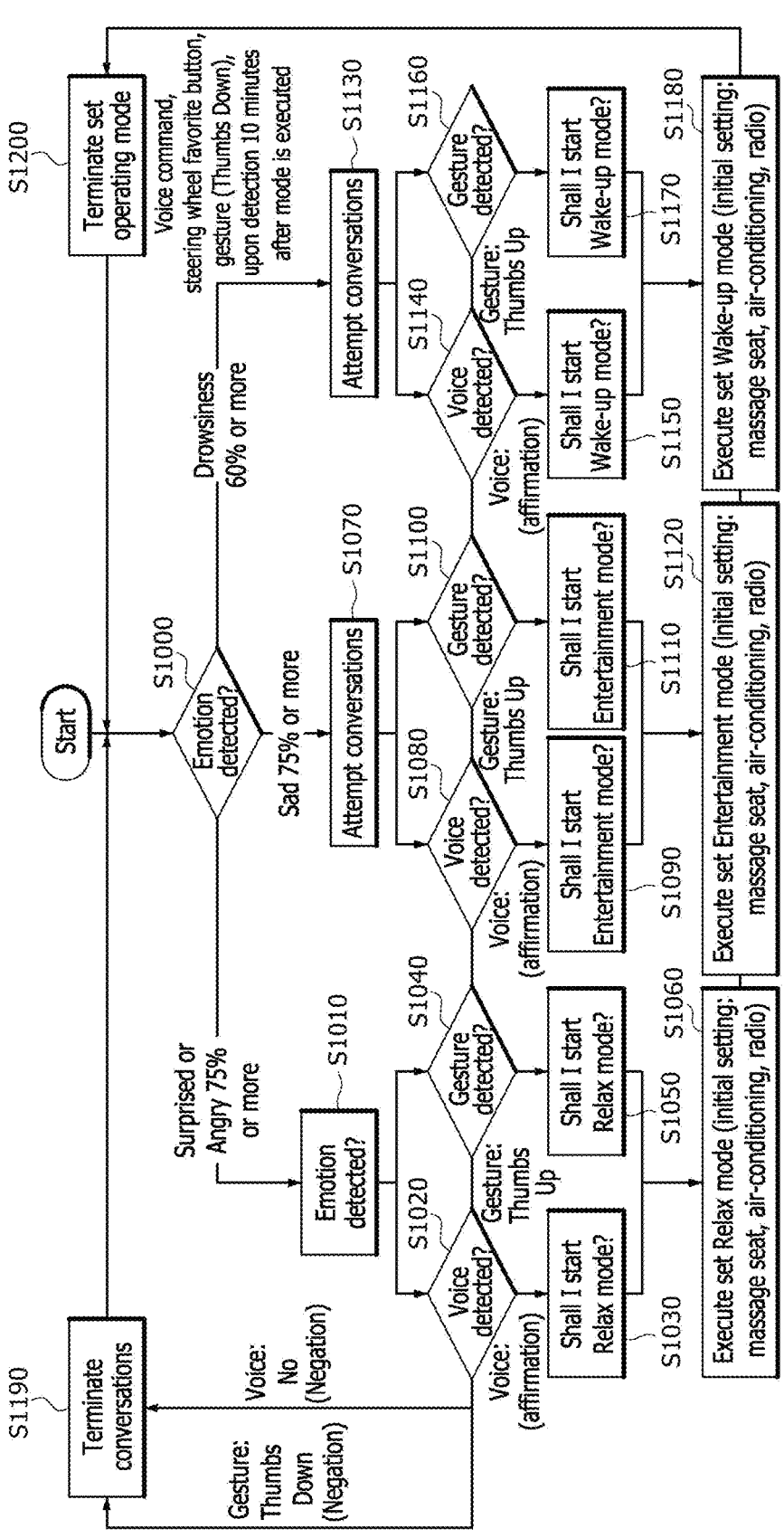
FIG. 3 is a flowchart illustrating an example of a method of controlling a convenience function of a vehicle according to an embodiment of the present disclosure.

FIG. 3 is a flowchart illustrating an example of a method of controlling a convenience function of a vehicle according to an embodiment of the present disclosure.

Referring to FIG. 3, first, the processor 700 recognizes a facial expression of a passenger by analyzing an image captured by the camera 100 (S1000).

In this case, the processor 700 may recognize the facial expression of the passenger as at least one of anger, surprise, sadness, drowsiness, depression, being tired, and being bored based on a numerical value of the facial expression.

When the numerical value of the facial expression is surprise 75% or more, the processor 700 attempts conversations with the passenger by outputting a Chatbot's voice through the voice output unit 400 (S1010).

At this time, the processor 700 detects a voice of the passenger through the voice input unit 500, and photographs a gesture of the passenger through the camera 100.

In this process, when the voice of the passenger is input through the voice input unit 500, the processor 700 determines whether an answer of the passenger is affirmation or negation (S1020).

When the answer of the passenger is affirmation as a result of the determination, the processor 700 outputs a voice (e.g., "Shall I start a relax mode?") that asks whether the relax mode will be started through the voice output unit 400 (S1030). In this process, the processor 700 may display an image or text that asks whether the relax mode will be started through the display unit 300 simultaneously with the voice.

Thereafter, the processor 700 confirms a response from the passenger, which is input through the voice input unit 500. The processor 700 performs a convenience function corresponding to the relax mode by controlling the convenience device 200 (S1060). In this case, the processor 700 may operate the massage seat, may output the sound of nature through an audio, or may generate a fragrance through a fragrance device.

After step S1010, the processor 700 also photographs a gesture of the passenger by controlling the camera 100.

In this process, when the gesture of the passenger is photographed by the camera 100, the processor 700 determines whether an answer of the passenger is affirmation (e.g., thumb up) or negation (e.g., thumb down) (S1040) by analyzing the photographed gesture.

When the answer of the passenger is affirmation as a result of the determination, the processor 700 outputs a voice (e.g., "Shall I start the relax mode?") that asks whether the relax mode will be started through the voice output unit 400 (S1050). In this process, the processor 700 may display an image or text that asks whether the relax mode will be started through the display unit 300 simultaneously with the voice.

Thereafter, the processor 700 confirms a response from the passenger, which is input through the voice input unit 500. The processor 700 performs a convenience function corresponding to the relax mode by controlling the convenience device 200 (S1060).

When the numerical value of the facial expression is sadness 75% or more, the processor 700 attempts conversations with the passenger by outputting a Chatbot's voice through the voice output unit 400 (S1070).

At this time, the processor 700 detects a voice of the passenger through the voice input unit 500 and photographs a gesture of the passenger by controlling the camera 100.

In this process, when the voice of the passenger is input through the voice input unit 500, the processor 700 determines whether an answer of the passenger is affirmation or negation (S1080).

When the answer of the passenger is affirmation as a result of the determination, the processor 700 outputs a voice (e.g., "Shall I start an entertainment mode?") that asks whether the entertainment mode will be started through the voice output unit 400 (S1090).

Thereafter, the processor 700 confirms a response from the passenger, which is input through the voice input unit 500. The processor 700 performs a convenience function corresponding to the entertainment mode by controlling the convenience device 200 (S1120). In this case, the processor 700 operates the massage seat, operates the air-conditioning device, or drives the radio.

After step S1070, the processor 700 photographs a gesture of the passenger by controlling the camera 100.

In this process, when the gesture of the passenger is photographed by the camera 100, the processor 700 determines whether an answer of the passenger is affirmation (e.g., thumb up) or negation (e.g., thumb down) by analyzing the photograph gesture (S1100).

When the answer of the passenger is affirmation as a result of the determination, the processor 700 outputs a voice (e.g., "Shall I start the entertainment mode?") that asks whether the entertainment mode will be started through the voice output unit 400 (S1110). In this process, the processor 700 may display an image or text that asks whether the entertainment mode will be started through the display unit 300 simultaneously with the voice.

Thereafter, the processor 700 confirms a response from the passenger, which is input through the voice input unit 500. The processor 700 performs a convenience function corresponding to the entertainment mode by controlling the convenience device 200 (S1120).

When the numerical value of the facial expression is drowsiness 60% or more, the processor 700 attempts conversations with the passenger by outputting a Chatbot's voice through the voice output unit 400 (S1130).

At this time, the processor 700 detects a voice of the passenger through the voice input unit 500, and photographs a gesture of the passenger by controlling the camera 100.

In this process, when a voice of the passenger is input through the voice input unit 500, the processor 700 determines whether an answer of the passenger is affirmation or negation (S1140).

When the answer of the passenger is affirmation as a result of the determination, the processor 700 outputs a voice (e.g., Shall I start a wake-up mode?") that asks whether the wake-up mode will be started through the voice output unit 400 (S1150). In this process, the processor 700 may display an image or text that asks whether the wake-up mode will be started through the display unit 300 simultaneously with the voice.

Thereafter, the processor 700 confirms a response from the passenger, which is input through the voice input unit 500. The processor 700 performs a convenience function corresponding to the wake-up mode by controlling the convenience device 200 (S1180). In this case, the processor 700 operates the massage seat, operates the air-conditioning device, or drives the radio.

After step S1130, the processor 700 also photographs a gesture of the passenger by controlling the camera 100.

In this process, when the gesture of the passenger is photographed by the camera 100, the processor 700 determines whether an answer of the passenger is affirmation (e.g., thumb up) or negation (e.g., thumb down) by analyzing the photographed gesture (S1160).

When the answer of the passenger is affirmation as a result of the determination, the processor 700 outputs a voice (e.g., "Shall I start the wake-up mode?") that asks whether the wake-up mode will be started through the voice output unit 400 (S1170). In this process, the processor 700 may display an image or text that asks whether the wake-up mode will be started through the display unit 300 simultaneously with the voice.

Thereafter, the processor 700 confirms a response from the passenger, which is input through the voice input unit 500. The processor 700 performs a convenience function corresponding to the wake-up mode by controlling the convenience device 200 (S1180).

As described above, in a process of providing a convenience function, when a voice command is input through the voice input unit 500, a steering wheel favorite button of the key input unit 600 is pressed or touched, a gesture (e.g., thumb down) is photographed by the camera 100, or a set time (e.g., 10 minutes) elapses after a corresponding operation mode is executed, the processor 700 terminates the operation mode that is currently performed (S1200).

Furthermore, in steps S1020, S1040, S1090, S1110, S1150, and S1170, when the answer of the passenger is negation, the processor 700 may terminate the conversations (S1190).

FIG. 4 is a flowchart illustrating another example of a method of controlling a convenience function of a vehicle according to an embodiment of the present disclosure.

Referring to FIG. 4, first, the processor 700 recognizes a facial expression of a passenger by analyzing an image photographed by the camera 100 (S2000).

In this case, the processor 700 may recognize the facial expression of the passenger as at least one of anger, surprise, sadness, drowsiness, depression, being tired, and being bored based on a numerical value of the facial expression of the passenger.

When the numerical value of the facial expression is sadness 75% or more, the processor 700 enters a recommendation mode (S2010).

The processor 700 performs the entertainment mode. In this case, the processor 700 operates the massage seat, operates the air-conditioning device, and drives the radio (S2020).

At the same time, the processor 700 receives a radio programming schedule in the form of an application program interface (API) (S2030).

The processor 700 classifies a radio channel within the API, which is currently broadcasted, as any one of a conversation channel and a music channel (S2040).

In this case, the processor 700 may classify the radio channel that is broadcasted when the facial expression is recognized as the conversation channel or the music channel based on the facial expression by previously learning the broadcasted radio channel. Furthermore, the processor 700 may learn a title or a writer that is displayed in an audio that is connected thereto through a CD, a USB, or smartphone Bluetooth. Even in this case, the processor 700 may learn the amplitude or frequency of the audio along with the title or the writer. That is, the processor 700 may extract a title, a writer, amplitude, and frequency of an audio and an average of beats per minute (BPM) of the audio, which is output by a system of a vehicle, regardless of the source of the audio, and may store the extracted title, writer, amplitude, frequency, and average of BPM in a database and learn them in synchronization with information the facial expression in real time.

As described above, the processor 700 extracts the title, writer, amplitude, or frequency of an audio, and an average of BPM of the audio, which is connected to an audio channel that is selected by a passenger, through a CD, a USB, or smartphone Bluetooth when a facial expression is recognized whenever a facial expression is recognized, and stores the title, write, amplitude, frequency, or average of BPM in a DB and learns the title, write, amplitude, frequency, or BPM in synchronization with information on the facial expression in real time. Thereafter, the processor 700 may select a learnt radio broadcasting channel based on a current facial expression of the passenger.

The conversation channel may include a news channel, a sports relay channel, a talk program channel, a vox pop channel, a documentary channel, and a drama channel.

The music channel may include a song channel, a classical music channel, and a voice music channel.

When the radio channel is classified as the conversation channel in step S2040, the processor 700 recommends a channel based on the analysis of the amplitude or frequency of a conversation and the type of conversation in the conversation channel that is currently broadcasted (S2050). In this case, the processor 700 may recommend a conversation channel in which the amplitude of a conversation is 60 dB or more and the frequency of the conversation is 100 Hz or more in the case of a man and 200 Hz or more in the case of a woman.

Next, the processor 700 recommends the selection of the recommended conversation channel (S2070). In this case, the processor 700 may recommend the selection in the form of a conversation voice through the voice output unit 400.

After the conversation channel is recommended, the processor 700 outputs a selected conversation channel when the conversation channel is selected by the passenger.

In this process, when a voice command is input through the voice input unit 500, the steering wheel favorite button of the key input unit 600 is pressed or touched, a gesture (e.g., thumb down) is photographed by the camera 100, or a set time (e.g., 10 minutes) elapses after a corresponding operation mode is executed, the processor 700 terminates the operation that is currently performed (S2080).

When the radio channel is classified as the music channel in step S2040, the processor 700 recommends a channel based on the analysis of the amplitude and frequency of music and the type of music in the music channel that is currently broadcasted (S2060). In this case, the processor 700 may recommend a music channel in which the amplitude of music is 80 dB or more and the frequency of the music is 150 Hz or more in the case of a man, 250 Hz or more in the case of a woman, and 300 Hz or more in the case of an instrument.

Next, the processor 700 recommends the selection of the recommended music channel (S2070). In this case, the processor 700 may recommend the selection in the form of a conversation voice through the voice output unit 400.

After the music channel is recommended, the processor 700 outputs a selected music channel when the music channel is selected by the passenger.

In this process, when a voice command is input through the voice input unit 500, the steering wheel favorite button of the key input unit 600 is pressed or touched, a gesture (e.g., thumb down) is photographed by the camera 100, or a set time (e.g., 10 minutes) elapses after a corresponding operation mode is executed, the processor 700 terminates the operation that is currently performed (S2080).

When the numerical value of the facial expression is drowsiness 60% or more as a result of the recognition in step S2000, the processor 700 enters the recommendation mode (S2090).

The processor 700 performs the wake-up mode. In this case, the processor 700 operates the massage seat, operates the air-conditioning device, and drives the radio (S2100).

At the same time, the processor 700 receives a radio programming schedule in the form of an API (S2110).

The processor 700 classifies a radio channel within the API, which is currently broadcasted, as any one of a conversation channel and a music channel (S2120).

In this case, the processor 700 may previously learn a radio channel that is broadcasted when a facial expression is recognized, and may classify the radio channel as the conversation channel or the music channel based on the recognized facial expression.

That is, the processor 700 learns a radio broadcasting channel selected by the passenger when a facial expression is recognized whenever a facial expression is recognized. Thereafter, the processor 700 may select the learnt radio broadcasting channel based on a current facial expression of the passenger.

The conversation channel may include a news channel, a sports relay channel, a talk program channel, a vox pop channel, a documentary channel, and a drama channel.

The music channel may include a song channel, a classical music channel, and a voice music channel.

When the radio channel is classified as the conversation channel in step S2120, the processor 700 recommends a channel based on the analysis of the amplitude or frequency of a conversation and the type of conversation in the conversation channel that is currently broadcasted (S2130). In this case, the processor 700 may recommend a conversation channel in which the amplitude of a conversation is 60 dB or more and the frequency of the conversation is 100 Hz or more in the case of a man and 200 Hz or more in the case of a woman.

Next, the processor 700 recommends the selection of the recommended conversation channel (S2150). In this case, the processor 700 may recommend the selection in the form of a conversation voice through the voice output unit 400.

After the conversation channel is recommended, the processor 700 outputs a selected conversation channel when the conversation channel is selected by the passenger.

In this process, when a voice command is input through the voice input unit 500, the steering wheel favorite button of the key input unit 600 is pressed or touched, a gesture (e.g., thumb down) is photographed by the camera 100, or a set time (e.g., 10 minutes) elapses after a corresponding operation mode is executed, the processor 700 terminates the operation that is currently performed (S2080).

When the radio channel is classified as the music channel in step S2120, the processor 700 recommends a channel based on the analysis of the amplitude and frequency of music and the type of music in the music channel that is currently broadcasted (S2140). In this case, the processor 700 may recommend a music channel in which the amplitude of music is 80 dB or more and the frequency of the music is 150 Hz or more in the case of a man, 250 Hz or more in the case of a woman, and 300 Hz or more in the case of an instrument.

Next, the processor 700 recommends the selection of the recommended music channel (S2150). In this case, the processor 700 may recommend the selection in the form of a conversation voice through the voice output unit 400.

After the music channel is recommended, the processor 700 outputs a selected music channel when the music channel is selected by the passenger.

When a voice command is input through the voice input unit 500, the steering wheel favorite button of the key input unit 600 is pressed or touched, a gesture (e.g., thumb down) is photographed by the camera 100, or a set time (e.g., 10 minutes) elapses after a corresponding operation mode is executed, the processor 700 terminates the operation that is currently performed (S2080).

As described above, the apparatus and method for controlling a convenience function of a vehicle according to embodiments of the present disclosure improve a commercial value and prevent an accident by recommending or providing a convenience function to a passenger through attempts on conversations with the passenger based on an emotion of the passenger.

Furthermore, the apparatus and method for controlling a convenience function of a vehicle according to embodiments of the present disclosure can provide a driver with new experiences by attempting conversations with the driver even in a situation in which the driver drives a vehicle alone.

An implementation described in this specification may be realized as a method or process, an apparatus, a software program, a data stream, or a signal, for example. Although the present disclosure has been discussed only in the context of a single form of an implementation (e.g., discussed as only a method), an implementation of a discussed characteristic may also be realized in another form (e.g., an apparatus or program). The apparatus may be implemented as proper hardware, software, or firmware. The method may be implemented in an apparatus, such as a processor commonly referring to a processing device, including a computer, a microprocessor, an integrated circuit, or a programmable logic device, for example. The processor includes a communication device, such as a computer, a cell phone, a mobile phone/personal digital assistant ("PDA"), and another device which facilitate the communication of information between end users.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

DESCRIPTION OF REFERENCE NUMERAL

100: camera
200: convenience device
300: display unit
400: voice output unit
500: voice input unit
600: key input unit
700: processor

What is claimed is:

1. An apparatus for controlling a convenience function of a vehicle, the apparatus comprising:

a camera configured to capture an image of a passenger;

a convenience device configured to provide a convenience function to the passenger;

a voice output unit configured to output a Chatbot's conversation voice;

a voice input unit configured to receive a conversation voice of the passenger; and a processor operatively connected to the camera, the convenience device, the voice output unit, and voice input unit and configured to recognize a facial expression of the passenger that is photographed by the camera and configured to recommend control over the convenience function to the passenger by performing conversations with the passenger through the voice output unit and the voice input unit based on the recognized facial expression of the passenger or to directly control the convenience function through the convenience device, wherein the processor recommends, to the passenger, a conversation channel based on the facial expression of the passenger.

2. The apparatus of claim 1, wherein the processor controls the convenience function based on the conversation voice of the passenger that is input through the voice input unit or a gesture of the passenger that is detected by the camera.

3. The apparatus of claim 1, wherein the convenience function is previously set according to an operation mode according to the facial expression of the passenger.

4. The apparatus of claim 1, wherein the processor further recommends, to the passenger, at least one of a conversation channel and a music channel that is scheduled in a radio programming schedule based on the facial expression of the passenger so that the passenger selects the music channel.

5. The apparatus of claim 1, wherein the processor recommends the conversation channel based on an analysis of an amplitude and frequency of the conversations and a type of the conversations.

6. The apparatus of claim 4, wherein the processor recommends the music channel based on an analysis of an amplitude and frequency of music, an analysis of beats per minute (BPM) of the music, and a type of the music.

7. The apparatus of claim 1, wherein, in response that a numerical value of the facial expression is equal to or higher than a predetermined value, the processor enters a recommendation mode.

8. The apparatus of claim 7, wherein in the recommendation mode, the processor operates a massage seat, an air-conditioning device, or driving of a radio.

9. A method of controlling a convenience function of a vehicle, the method comprising:

capturing, by a camera, an image of a passenger;

recognizing, by a processor operatively connected to the camera, a facial expression of the passenger that has been photographed by the camera; and recommending, by the processor, control over a convenience function to the passenger through a voice output unit and a voice input unit operatively connected to the processor, based on the facial expression of the passenger by performing conversations with the passenger or directly controlling, by the processor, the convenience function, wherein in the recommending of the control over the convenience function to the passenger or the directly controlling of the convenience function, the processor recommends, to the passenger, a conversation channel based on the facial expression of the passenger.

10. The method of claim 9, wherein in the recommending of the control over the convenience function to the passenger or the directly controlling of the convenience function, the processor controls the convenience function based on a conversation voice of the passenger that is input through the voice input unit or a gesture of the passenger that is detected through the camera.

11. The method of claim 9, wherein the convenience function is previously set based on the facial expression of the passenger.

12. The method of claim 9, wherein in the recommending of the control over the convenience function to the passenger or the directly controlling of the convenience function, the processor recommends, to the passenger, a music channel that is scheduled in a radio programming schedule based on the facial expression of the passenger so that the passenger selects the music channel.

13. The method of claim 9, wherein in the recommending of the control over the convenience function to the passenger or the directly controlling of the convenience function, the processor recommends the conversation channel based on an analysis of an amplitude and frequency of the conversations and a type of the conversations.

14. The method of claim 12, wherein in the recommending of the control over the convenience function to the passenger or the directly controlling of the convenience function, the processor recommends the music channel based on an analysis of an amplitude and frequency of music, an analysis of beats per minute (BPM) of the music, and a type of the music.

15. The method of claim 9, wherein, in response that a numerical value of the facial expression is equal to or higher than a predetermined value, the processor enters a recommendation mode.

16. The apparatus of claim 15, wherein in the recommendation mode, the processor operates a massage seat, an air-conditioning device, or driving of a radio.

17. A non-transitory computer readable storage medium on which a program for performing the method of claim 9 is recorded.

18. An apparatus for controlling a convenience function of a vehicle, the apparatus comprising:

a camera configured to capture an image of a passenger;

a convenience device configured to provide a convenience function to the passenger;

a voice output unit configured to output a Chatbot's conversation voice;

a voice input unit configured to receive a conversation voice of the passenger; and a processor operatively connected to the camera, the convenience device, the voice output unit, and voice input unit and configured to recognize a facial expression of the passenger that is photographed by the camera and configured to recommend control over the convenience function to the passenger by performing conversations with the passenger through the voice output unit and the voice input unit based on the recognized facial expression of the passenger or to directly control the convenience function through the convenience device, wherein the processor recommends, to the passenger, a music channel that is scheduled in a radio programming schedule based on the facial expression of the passenger, and wherein the processor recommends the music channel based on an analysis of an amplitude and frequency of music, an analysis of beats per minute (BPM) of the music, and a type of the music.

* * * * *